US012775727B2

(12) United States Patent
Kirigin

(10) Patent No.: US 12,775,727 B2
(45) Date of Patent: Oct. 27, 2026

(54) GLOBAL LINK PROVIDING MODIFICATION RIGHTS TO A SHARED FOLDER

(71) Applicant: Dropbox, Inc., San Francisco, CA (US)

(72) Inventor: Ivan Kirigin, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/893,703

(22) Filed: Aug. 23, 2022

(65) Prior Publication Data

US 2023/0016343 A1 Jan. 19, 2023

Related U.S. Application Data

(63) Continuation of application No. 13/723,396, filed on Dec. 21, 2012, now abandoned.

(60) Provisional application No. 61/693,972, filed on Aug. 28, 2012.

(51) Int. Cl.
*H04L 9/40* (2022.01)
*G06F 21/62* (2013.01)

(52) U.S. Cl.
CPC .......... *G06F 21/6218* (2013.01); *H04L 63/10* (2013.01); *H04L 63/168* (2013.01)

(58) Field of Classification Search
CPC .... G06F 21/6218; H04L 63/10; H04L 63/168
See application file for complete search history.

(56) References Cited

U.S. PATENT DOCUMENTS

| | | | |
|---|---|---|---|
| 6,684,212 B1 | 1/2004 | Day et al. | |
| 6,687,741 B1 | 2/2004 | Ramaley et al. | |
| 6,988,138 B1 | 1/2006 | Alcorn et al. | |
| 7,177,426 B1 | 2/2007 | Dube et al. | |
| 7,206,806 B2 | 4/2007 | Pineau et al. | |
| 7,401,104 B2 | 7/2008 | Shah et al. | |
| 7,627,652 B1 * | 12/2009 | Commons | H04L 67/1097 709/219 |
| 7,676,526 B1 | 3/2010 | Beloussov et al. | |
| 7,730,113 B1 | 6/2010 | Payette et al. | |
| 7,734,690 B2 | 6/2010 | Moromisato et al. | |
| 7,756,892 B2 | 7/2010 | Levy et al. | |
| 7,822,793 B2 | 10/2010 | Rawat et al. | |
| 7,970,850 B1 | 6/2011 | Callanan et al. | |
| 8,065,424 B2 | 11/2011 | Foresti et al. | |

(Continued)

OTHER PUBLICATIONS

Final Office Action from U.S. Appl. No. 13/723,396, mailed Mar. 6, 2020, 22 pages.

(Continued)

*Primary Examiner* — Hares Jami

(74) *Attorney, Agent, or Firm* — Keller Preece PLLC

(57) ABSTRACT

A computer-implemented system and method of sharing files between a link sharer and a link recipient over a network. A folder sharing link is generated in response to a request by a link sharer, where the link provides a link recipient the ability to modify the contents of the folder. In response to receiving an indication that the generated link has been activated by a link recipient, the system either automatically grants modification rights to the folder or requests manual approval from the link sharer to grant modification rights to the link recipient. Once modification rights have been granted, the system adds the shared folder to the link recipient's account within the context of a document management system.

20 Claims, 11 Drawing Sheets

(56) References Cited

U.S. PATENT DOCUMENTS

| | | | |
|---|---|---|---|
| 8,140,506 B2 | 3/2012 | Pennington et al. | |
| 8,176,123 B1 * | 5/2012 | Wang | G06F 16/10 709/215 |
| 8,194,940 B1 | 6/2012 | Kiyohara et al. | |
| 8,468,099 B2 | 6/2013 | Headings et al. | |
| 9,049,176 B2 | 6/2015 | Ferdowsi et al. | |
| 2002/0073443 A1 | 6/2002 | Heifetz et al. | |
| 2002/0133515 A1 | 9/2002 | Kagle et al. | |
| 2002/0143782 A1 | 10/2002 | Headings et al. | |
| 2003/0014477 A1 | 1/2003 | Oppenheimer et al. | |
| 2003/0097410 A1 | 5/2003 | Atkins et al. | |
| 2003/0120729 A1 | 6/2003 | Kim et al. | |
| 2003/0152904 A1 | 8/2003 | Doty et al. | |
| 2003/0227487 A1 | 12/2003 | Hugh | |
| 2004/0025025 A1 | 2/2004 | Venkatesan et al. | |
| 2004/0044746 A1 | 3/2004 | Matsusaka et al. | |
| 2004/0230793 A1 | 11/2004 | Estrada et al. | |
| 2005/0076030 A1 | 4/2005 | Hada et al. | |
| 2005/0091289 A1 | 4/2005 | Shappell et al. | |
| 2005/0240428 A1 | 10/2005 | Gabrick et al. | |
| 2006/0031489 A1 | 2/2006 | Marcjan et al. | |
| 2006/0061599 A1 | 3/2006 | Yu et al. | |
| 2006/0095514 A1 | 5/2006 | Wang et al. | |
| 2006/0133407 A1 | 6/2006 | Kuisma et al. | |
| 2006/0230030 A1 | 10/2006 | Volpa et al. | |
| 2007/0124500 A1 | 5/2007 | Bedingfield et al. | |
| 2007/0156434 A1 | 7/2007 | Martin et al. | |
| 2007/0174341 A1 | 7/2007 | Saripalli et al. | |
| 2007/0203917 A1 | 8/2007 | Du et al. | |
| 2007/0214169 A1 | 9/2007 | Audet et al. | |
| 2007/0239760 A1 | 10/2007 | Simon et al. | |
| 2007/0260747 A1 | 11/2007 | Samzelius et al. | |
| 2008/0091725 A1 | 4/2008 | Hwang et al. | |
| 2008/0109910 A1 | 5/2008 | Day et al. | |
| 2008/0215588 A1 * | 9/2008 | Mattheisen | G06F 21/604 707/999.009 |
| 2008/0216139 A1 | 9/2008 | Liwerant et al. | |
| 2008/0244721 A1 | 10/2008 | Barrus et al. | |
| 2008/0263103 A1 * | 10/2008 | McGregor | G06F 16/447 |
| 2008/0301247 A1 * | 12/2008 | Halim | G06F 16/1787 709/206 |
| 2009/0216569 A1 | 8/2009 | Bonev et al. | |
| 2009/0287715 A1 | 11/2009 | Chi et al. | |
| 2009/0300723 A1 | 12/2009 | Nemoy et al. | |
| 2010/0011431 A1 | 1/2010 | Cynkin et al. | |
| 2010/0063961 A1 | 3/2010 | Guiheneuf et al. | |
| 2010/0185698 A1 | 7/2010 | Lee et al. | |
| 2010/0198871 A1 * | 8/2010 | Stiegler | G06F 16/1767 709/206 |
| 2010/0199171 A1 * | 8/2010 | Grosso | G06Q 30/02 715/234 |
| 2010/0211998 A1 | 8/2010 | Soelberg et al. | |
| 2010/0274864 A1 | 10/2010 | Jalili et al. | |
| 2011/0137986 A1 | 6/2011 | Wolf et al. | |
| 2011/0145930 A1 * | 6/2011 | Gnech | H04L 63/10 726/28 |
| 2011/0154456 A1 | 6/2011 | Machani et al. | |
| 2011/0167159 A1 | 7/2011 | Bethlehem et al. | |
| 2011/0264532 A1 | 10/2011 | Chan et al. | |
| 2011/0264768 A1 | 10/2011 | Walker et al. | |
| 2011/0276638 A1 | 11/2011 | Errico et al. | |
| 2011/0287748 A1 | 11/2011 | Angel et al. | |
| 2012/0127328 A1 | 5/2012 | Winbush, III et al. | |
| 2012/0131005 A1 | 5/2012 | Shen et al. | |
| 2012/0151002 A1 | 6/2012 | Lin et al. | |
| 2012/0197980 A1 | 8/2012 | Terleski et al. | |
| 2012/0209892 A1 | 8/2012 | Macaskill et al. | |
| 2012/0278404 A1 | 11/2012 | Meisels et al. | |
| 2012/0290686 A1 | 11/2012 | Anchan et al. | |
| 2012/0324121 A1 | 12/2012 | Carr et al. | |
| 2013/0013560 A1 | 1/2013 | Goldberg et al. | |
| 2013/0013561 A1 | 1/2013 | Chan et al. | |
| 2013/0067303 A1 * | 3/2013 | Kantor | G06F 16/958 715/205 |
| 2013/0091026 A1 | 4/2013 | Deng et al. | |
| 2013/0174272 A1 | 7/2013 | Chevalier et al. | |
| 2013/0332854 A1 | 12/2013 | Roman et al. | |
| 2013/0332856 A1 | 12/2013 | Sanders et al. | |

OTHER PUBLICATIONS

Fujimura K., et al., "General-purpose Digital Ticket Framework," 1998, In Proceedings of the 3rd Conference on USENIX Workshop on Electronic Commerce (WOEC'98), Retrieved from https://www.usenix.org/legacy/publications/library/proceedings/ec98/full_papers/fujimura/fujimura.pdf on Apr. 9, 2018, vol. 3, 11 pages.

"GIMP Quickies," retrieved from http://www.gimp.org/tutorials/GIMP_Quickies/ on Oct. 1, 2014, 13 pages.

Hardjono T., et al., "Design and Security Issues in Strongbox Systems for the Internet," Proceedings of the 1996 International Conference on Cryptology and Information Security, Kaohsiung, Taiwan, https://ro.uow.edu.au/cgi/viewcontent.cgi?article=2150&context=infopapers, Dec. 19-21, 1996, pp. 99-103.

Hardjono T., et al., "Secure Access to Electronic Strongboxes in Electronic Commerce," Proceedings of 2nd International Small Systems Security Conference (IFIP WG 11.2), Copenhagen, Denmark, Downloaded from https://ro.uow.edu.au/cgi/viewcontent.cgi?referer=https://www.google.com/&httpsredir=1&article=2160&context=infopapers, May 1997, pp. 1-13.

Hardjono T., et al., "Strong Boxes for Electronic Commerce," Proceedings of the 1996 USENIX Workshop on Electronic Commerce, Oakland, California, USA, Downloaded from https://ro.uow.edu.au/cgi/viewcontent.cgi?article=2151&context=infopapers, Nov. 1996, pp. 135-145.

International Search Report and Written Opinion for PCT Application No. PCT/US2011/041531 mailed on Apr. 6, 2012, 8 pages.

Matsuyama K., et al., "Distributed Digital-ticket Management for Rights Trading System," In Proceedings of the 1st ACM Conference on Electronic commerce (EC '99), ACM, 1999, pp. 110-118.

Mearian L., "Facebook users get Dropbox file share option," Computerworld, Sep. 26, 2012, 5:38 PM PT, retrieved from https://web-beta.archive.org/web/20150215093506/http://www.computerworld.com/article/2491690/cloud-computing/facebook-users-get-dropbox-file-share-option.html on Apr. 9, 2017, 2 pages.

Non-Final Office Action from U.S. Appl. No. 13/723,396, mailed Sep. 19, 2019, 37 pages.

Notice of Allowance for U.S. Appl. No. 13/597,301 mailed on Feb. 27, 2015, 14 pages.

Office Action for U.S. Appl. No. 13/217,944 mailed on Dec. 7, 2012, 9 pages.

Office Action for U.S. Appl. No. 13/217,944 mailed on Jul. 12, 2013, 10 pages.

Office Action for U.S. Appl. No. 13/217,944 mailed on July 14, 2014, 9 pages.

Office Action for U.S. Appl. No. 13/596,735 mailed on Mar. 13, 2013, 22 pages.

Office Action for U.S. Appl. No. 13/596,735 mailed on Nov. 13, 2012, 9 pages.

Office Action for U.S. Appl. No. 13/596,735 mailed on Oct. 29, 2014, 23 pages.

Office Action for U.S. Appl. No. 13/597,301 mailed on Apr. 17, 2013, 38 pages.

Office Action for U.S. Appl. No. 13/597,301 mailed on May 23, 2014, 20 pages.

Office Action for U.S. Appl. No. 13/597,301 mailed on Oct. 23, 2014, 19 pages.

Office Action for U.S. Appl. No. 13/723,074 mailed on June 26, 2014, 37 pages.

Office Action for U.S. Appl. No. 13/723,074 mailed on Oct. 21, 2014, 40 pages.

Penner J.E., "The Idea of Property in Law," 1997, Clarendon Press, retrieved from https://books.google.com/books, located by Google search: rights are intangible abstractions on Apr. 5, 2017, pp. 146-148.

(56) References Cited

OTHER PUBLICATIONS

Popitsch N., et al., "Ad-hoc File Sharing Using Linked Data Technologies," University of Vienna, Department of Distributed and Multimedia Systems, pp. 1-12.

* cited by examiner

B

GLOBAL LINK PROVIDING MODIFICATION RIGHTS TO A SHARED FOLDER

CROSS-REFERENCE TO RELATED APPLICATIONS

This application is a continuation of and claims the benefit of U.S. application Ser. No. 13/723,396, filed on Dec. 21, 2012, entitled "GLOBAL LINK PROVIDING MODIFICATION RIGHTS TO A SHARED FOLDER", which claims priority to U.S. Provisional Application No. 61/693,972, filed Aug. 28, 2012, entitled, "GLOBAL LINK PROVIDING MODIFICATION RIGHTS TO A SHARED FOLDER," All of which are expressly incorporated by reference herein in their entireties.

FIELD

Various embodiments described herein relate generally to sharing files over a network. Particular embodiments pertain to systems and methods for allowing a user to provide others with shared access to folders of documents stored within a document management service, such as a cloud-based document management service.

BACKGROUND

Individuals often wish to share digital files with others. In some cases, a particular individual may wish to simply share copies of files with others. In other instances, it may be desirable to allow others to modify copies of one or more files stored centrally within a particular shared folder. There is currently a need for a system that allows individuals to more easily share copies of files and folders with others. This can be useful in cases, for example, where it is desirable to have certain individuals collaborate to produce a particular document or collection of documents.

SUMMARY OF THE INVENTION

A computer-implemented method, in various embodiments, comprises (1) receiving a request, from a link sharer, to generate a link that, when activated, facilitates providing modification rights to a folder of digital content; (2) in response to said request, generating a link that, when activated by a link recipient, facilitates providing modification rights to said folder; (3) receiving an indication that said link has been activated; and (4) in response to receiving said indication, facilitating the provision of modification rights, to the link recipient, to said folder.

A computer-implemented method, in various embodiments, of sharing files between a link sharer and a link recipient comprising the steps of (1) in response to receiving a request to share a folder containing digital content, generating a link that, when activated, facilitates providing modification rights to said digital content in said folder; (2) at least partially in response to receiving an indication that said folder sharing link has been activated, executing a step that is selected from a group consisting of: (i) automatically granting modification rights to the folder at least partially based on the satisfaction of at least one permission criterion; and (ii) requesting manual approval from a link sharer to provide modification rights to the shared folder.

BRIEF DESCRIPTION OF THE DRAWINGS

Various embodiments of a computer system for providing shared access to a particular folder are described below. In the course of this description, reference will be made to the accompanying drawings, which are not necessarily drawn to scale, and wherein.

DETAILED DESCRIPTION

Figure 1:
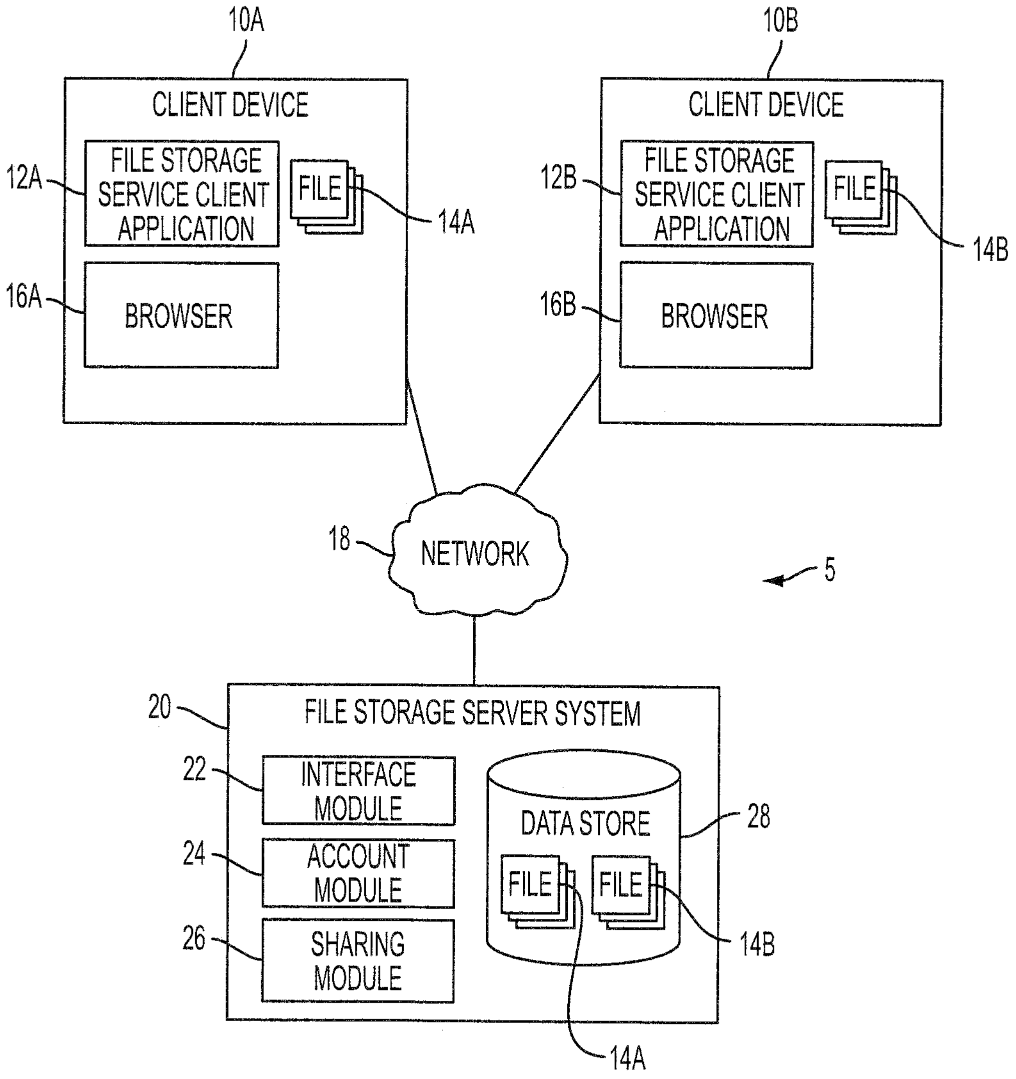
FIG. 1 is a block diagram of a file management system in accordance with an embodiment of the present system.

Various embodiments will now be described. It should be understood that the present system and method may be embodied in many different forms and should not be construed as limited to the embodiments set forth herein. Rather, these embodiments are provided so that this disclosure will be thorough and complete, and will fully convey the scope of the present system and method to those skilled in the art. Like numbers refer to like elements throughout.

System Overview

In various embodiments, a file sharing and retrieval system is provided that allows a first user (the "link sharer") to create a link that provides shared access to a folder or a group of folders. The shared access to a particular folder may involve, for example, adding the folder to a user's account within a shared file service (e.g., a cloud-based shared file service); and/or (2) allowing the user (e.g., the recipient of the link, or "link recipient") to modify the folder and the contents therein. For example, after receiving shared access to a particular folder, the link recipient may be able to edit, delete, add or modify files in the folder associated with the link. In various embodiments, the link may, for example, be a URL or any other suitable indicia that includes a file path to the files and/or folders. Once created, the link sharer can share the link with the link recipient to allow the link recipient to collaborate with other individuals in writing and/or editing documents within the folder.

Once the link recipient clicks on the link (if it is an active link) or copies the link and pastes it into their browser's address bar, the system may add a folder associated with the link to the link recipient's account with a document management service (e.g., a cloud-based, synched document management service), and provide the link recipient with modification rights to the folder and its contents. In a particular embodiment, the user's browser may also open a new window that displays the contents of the shared folder so that the user may immediately begin working with the files.

In various embodiments, when the link recipient activates the link, the file storage server system may either automatically provide the link recipient with shared access to the shared folder, or not act on the activation of the link until the link sharer manually grants modification rights to the link recipient.

The file storage server system may automatically grant shared access to a particular folder, for example, in response to determining that one or more permission criteria specified by the link sharer have been satisfied. Such permission criteria may, for example, be defined globally as preferences by the link sharer, or established on a link-by-link basis. This may, for example, permit the link sharer both flexibility and efficiency during generation of the link.

In various embodiments, permission criteria may include, for example: (1) the link sharer and the link recipient belonging to a common domain, social media collective or other user-defined group; (2) the link recipient's e-mail address being included in the link sharer's contact information or address book; and/or (3) the link recipient being a registered user of the file storage server system. In other embodiments, the criteria may be based on any number of other conditions determinable by the system. In various embodiments, if the specified criteria are met, the system may provide the link recipient with shared access to the folder. In other embodiments, the link sharer may specify that they must specifically authorize shared access to the folder after the link recipient activates the link. Thus, in these embodiments, activation of the link acts as a request from the link recipient for shared access to the folder.

Exemplary System Platform

An exemplary platform for implementing various embodiments will now be discussed. Referring to FIG. 1, a system 5 implementing folder sharing and modification access through link sharing is shown having a plurality of client devices 10A and 10B (collectively 10) and a file storage server system 20, which are all interconnected by at least one network 18. Various aspects of client devices and file storage server systems are discussed below.

Client Devices

In various embodiments, each client device 10 has a file storage service client application 12A and 12B (collectively 12) through which respective files 14A and 14B of that client are specified for storage in file storage server system 20. It is noted that in some embodiments synchronized copies of files 14A and 14B may be kept on both file storage server system 20 and each respective client device 10. In some embodiments, client devices 10 may provide a file-browser type interface (not shown) for directly manipulating the files stored on file storage server system 20 without maintaining a local copy, such as on a smartphone or tablet computer. Client devices 10 may also include a web browser 16A and 16B (collectively 16) for retrieving and presenting web pages and other content from web servers. Examples of suitable web browsers that may be used by client devices 10 include FIREFOX, GOOGLE CHROME, INTERNET EXPLORER, OPERA, and SAFARI. It should be understood by those skilled in the art that web browser 16 may optionally be used to access file storage server system 20 instead of using file storage service client application 12.

Still referring to FIG. 1, while only two client devices 10A and 10B are shown for purposes of clarity, it should be understood by those skilled in the art that many client devices may simultaneously connect through network 18 to file storage server system 20 at any given time. Examples of client devices 10 include, but are not limited to a desktop computer, a laptop computer, a tablet-computing device and a handheld computing device such as a personal digital assistant, a tablet computer or a smart phone (e.g., an IPHONE or BLACKBERRY, or a SYMBIAN or ANDROID-based smart phone). Each client device 10 may store one or more files on file storage server system 20, and the files may be stored in any file format. When file storage service client application 12 presents files to a user, the files may be arranged in folders and the folders themselves may be arranged in other folders, or in any other arbitrary arrangement supported by file storage server system 20, as determined by the user. However, one of skill in the art should understand in light of this disclosure that each user's file storage architecture may be considerably different from the next, and in some instances, the file storage architecture may be implemented to maximize storage and file retrieval efficiency.

File Storage Server System

File storage server system 20 stores files and manages access to those files by client devices 10. File storage server system 20 and its components may be implemented using any appropriate hardware and software for performing file serving, storage and retrieval functions. For purposes of clarity and ease of description, FIG. 1 illustrates an exemplary file storage server 20.

File Storage Server System—Interface Module

In various embodiments, file storage server system 20 includes an interface module 22, an account module 24, a link-based sharing module 26 and a data store 28. Interface module 22 facilitates file access and file storage between file storage server system 20 and client devices 10. Interface module 22 receives files from and sends files to client devices 10 consistent with the user's preferences for sharing files. Interface module 22 may act as the counterpart to a client-side file storage service client application 12A, 12B user interface that allows a user to manipulate files directly stored on file storage server system 20. In some embodiments, software operating on client devices 10 integrates network-stored files with the client's local file system to enable a user to manipulate network-stored files through the same user interface (UI) used to manipulate files on the local file system, e.g., via a file explorer, file finder or browser application. As an alternative or supplement to the client-side file-explorer interface, user interface module 22 may provide a web interface for client devices 10 to access (e.g. via browser 16) and allow a user to manipulate files stored on file storage server system 20. In this way, the user can directly manipulate files stored on file storage server system 20.

File Storage Server System—Data Store

In various embodiments, data store 28 stores files such as those uploaded using client devices 10. In the embodiment illustrated in FIG. 1, a first user associated with client 10A (e.g. a link sharer) has certain files 14A associated with their account, and a second user associated with client 10B (e.g. a link recipient) has certain files 14B associated with their account. Copies of these files are stored in data store 28. Copies of each respective user's files may also be locally stored on multiple client devices 10 associated with the user.

Data store 28 maintains, for each user, information identifying the user, information describing the user's file directory, etc. in a file journal that is maintained for each user. In some embodiments, the file journal is maintained on file storage server system 20. This file journal may be updated periodically using information obtained directly from the file storage server system 20 and/or from information obtained from one or more client devices 10. In this way, the server-stored file journal on file storage server system 20 (hereinafter the "server-side file journal") is updated when a file is changed at the server or on the local client. The file storage server system 20 then communicates with one or more clients devices 10 to assure that any relevant changes are reflected locally. For example, if a particular user makes a change to a particular file on a first client device, the change will be reflected in the server-side file journal, and the server-side file journal will be used to propagate the changes so that they are reflected both on the file storage server system 20 and on all client devices associated with the user. Such techniques may be implemented, for example, within the context of a synchronized file system such as the DROPBOX service of Dropbox, Inc. of San Francisco, CA.

File Storage Server System—Account Module

Account module 24 tracks files stored in data store 28 and entries in the server-side file journal for each file. As users grant other users modification rights, account module 24 updates the server-side file journal associated with each user in data store 20. Account module 24 may also track client devices 10 that are associated with each user's account. Such devices may include, for example, a user's desktop computer, tablet computer, and handheld device.

File Storage Configuration

Figure 2A:
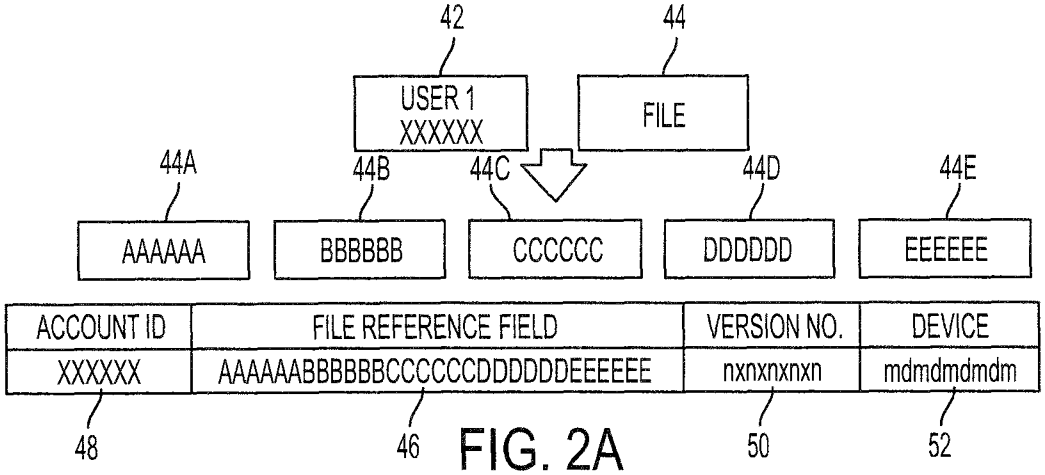
FIGS. 2A-2B are schematic representations of one embodiment of how files are segmented and stored in the file management system of FIG. 1.

Referring to FIG. 2A, to expedite file handling and updating, in one embodiment, files stored in data store 28 are segmented. That is, when user 42 uploads the file to data store 28, file storage server system 20 is configured to segment the file into file segments 44A-44E and to assign a unique identifier to each file segment. In one embodiment, the file segments may be four (4) megabytes in size, but it should be understood by those skilled in the art in light of this discussion that the size of the file segments can be of any suitable size. In one embodiment, first file segment 44A is assigned a unique identifier AAAAAA, file segment 44B is assigned identifier BBBBBB, and so forth. In one embodiment, the unique identifier is a hash value calculated for each file segment using one or more hashing methods. In some embodiments, the file segments are stored in memory and may be retrieved using the hash value for the file segment. To retrieve the file, the system may be adapted to use the respective unique identifiers for the various file segments to retrieve each file segment and then reconstruct the file for use by the user.

In various embodiments, file storage server system 20 is also configured to create a unique file reference string 46 for each file by concatenating file segment identifiers 44A-44E. User identifier XXXXXX 48 and file reference string 46 are placed in a file journal entry 47. It should be understood that other information such as a version reference 50 and device reference 52 may also be included in file journal entry 48. In still other embodiments, information (metadata) related to the file and its content (e.g., image orientation, pixel resolution and file type if the file is an image) may also be included in the file journal entry to properly orient and process the file for ease of viewing. Those skilled in the art will understand from this disclosure that any information associated with a file might be included in file journal entry 48 to enhance the features of the present system. In yet other embodiments, file journal entry 48 may be entered into a single server-side file journal that is used for all users. In yet other embodiments, the system may assign each user their own server-side file journal so that only file journal entries for each file associated with that user are stored in their respective server-side file journal.

Figure 2B:
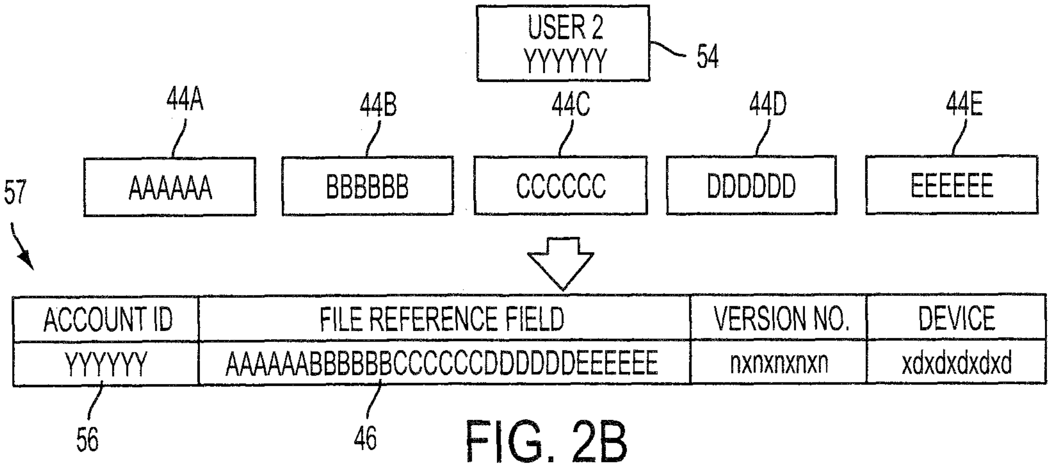

Referring to FIG. 2B, when file 44 is shared with another user 54 having a unique user ID YYYYYY 56, in one embodiment, file storage system 20 is configured to create another file journal entry 57 that associates file reference string 46 with the unique user identifier YYYYYY for user 54. Thus, when another user 54 is granted access to a file, it is unnecessary to store additional copies of the file in data store 28. Instead, when the other user clicks the file link, file journal entry 57 is used to reconstruct the file. That is, file storage server system 20 breaks the concatenated file journal entry 57 into its constituent parts and uses the unique segment identifiers to retrieve the various file segments that constitute the file. File storage server system 20 reconstructs the file from the various file segments and displays the file to the requesting user. It should be understood based on this disclosure to those skilled in the art that other efficient methods of file storage and user association may be used within the context of the present system and are within the scope of the disclosed system.

File Storage Server System—Sharing Module

In various embodiments, the link sharer, as defined above as the person sharing the link, can select any folder, or combination of folders, to be shared with one or more other users. It should be understood that, in various embodiments, when a user shares a folder with other users, the other users are granted modification rights to the digital content contained within the folder(s). As such, a user who has modification rights to a folder may add digital content to the folder, delete digital content from the folder or edit any digital content contained in the shared folder. In certain embodiments, sharing a folder with a user also causes the folder to be added to the user's account within the context of a content management service.

Figure 3:
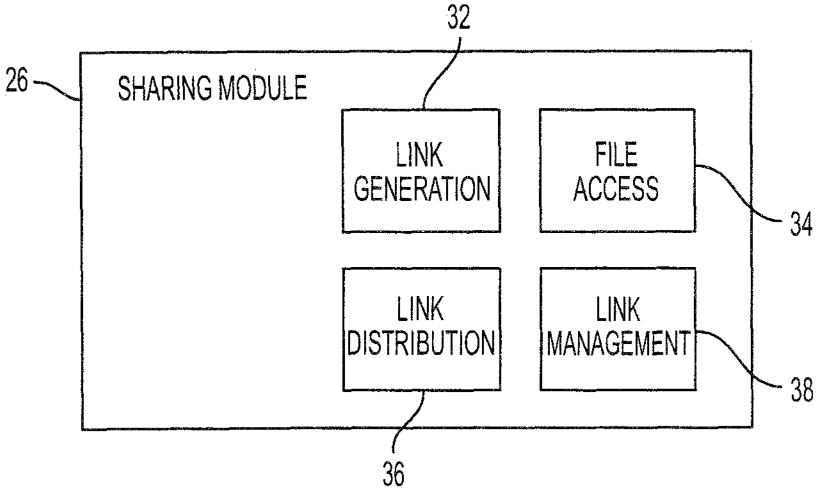
FIG. 3 is a block diagram of a sharing module for use in the file management system of FIG. 1.

Referring to FIG. 3, a block diagram illustrating the components of a link-based sharing module 26 in accordance with embodiments of the present system is shown. Link-based sharing module 26 enables a user to provide others access and modification rights to the user's folder through a shared link. Link-based sharing module 26 comprises a link generation module 32 for generating links to the shared folder(s), a file access module 34 for accessing the files via the generated links, a link distribution module 36 for facilitating distribution of links to other users, and a link management module 38 for viewing generated links.

Link generation module 32 is configured to generate a link corresponding to the folder specified by the user. In one embodiment, upon receiving a request to share a particular folder, link generation module 32 generates the unique folder descriptor of the shared folder and a unique file location path or URL that serves as the link. Sharing module 26 saves an association of the folder descriptor and the file location path or URL to data store 28. In some embodiments, the generated folder sharing link is independent of the folder descriptor so that the folder descriptor cannot be inferred from the folder sharing link, and vice versa. An independent folder descriptor and file location path or URL prevents malfeasance by making it essentially impossible to guess or reverse engineer a sharable link. As an example, when sharing a folder "Reunion" with a file ID of 3D8B99, link generation module 32 might generate a unique (e.g., one-way pad, or a pseudo-random value) URL www.service-.com/s/2608u2mnco/BBQ, where the URL component 2608u2mnco cannot be reverse-engineered, and accordingly create an entry <3D8B99, www.service.com/s/2608u2mnco/BBQ> in data store 28. In some embodiments, the generated URL www.service.com/s/2608u2mnco/BBQ can further be shortened using a link-shortening service to a shorter URL (e.g., db.tt/xOFounw) and an additional association between the original link and the shortened link can be added to data store 28. In another embodiment, the folder can be directly associated with the shortened link rather than with an intermediate, longer generated link.

In still other embodiments, a user can generate multiple different links to the same folder. Thus, the user can more selectively control access to the folder by distributing different selections from among the multiple different links to different link-recipients or sets thereof. This may, for example, allow a user to deactivate certain links while keeping others active.

In various embodiments, the generated folder sharing link can be used to provide many users shared access to a folder and the contents therein. For example, the link may be posted to a website such as LinkedIn. In these embodiments, the link sharer may create a link to a folder that is relevant to a particular group of users on LinkedIn. By posting the link on the LinkedIn page, members of the group can use the link to access the folder. In this way, the link sharer can provide modification rights to many recipients without having to send a specific folder sharing invitation to each individual group member. Use of a global shared folder link may be advantageous, for example, in situations in which a content sharer does not have information about each member of a group, but wishes to share content with all members of a group.

Exemplary System Operation

Figure 4:
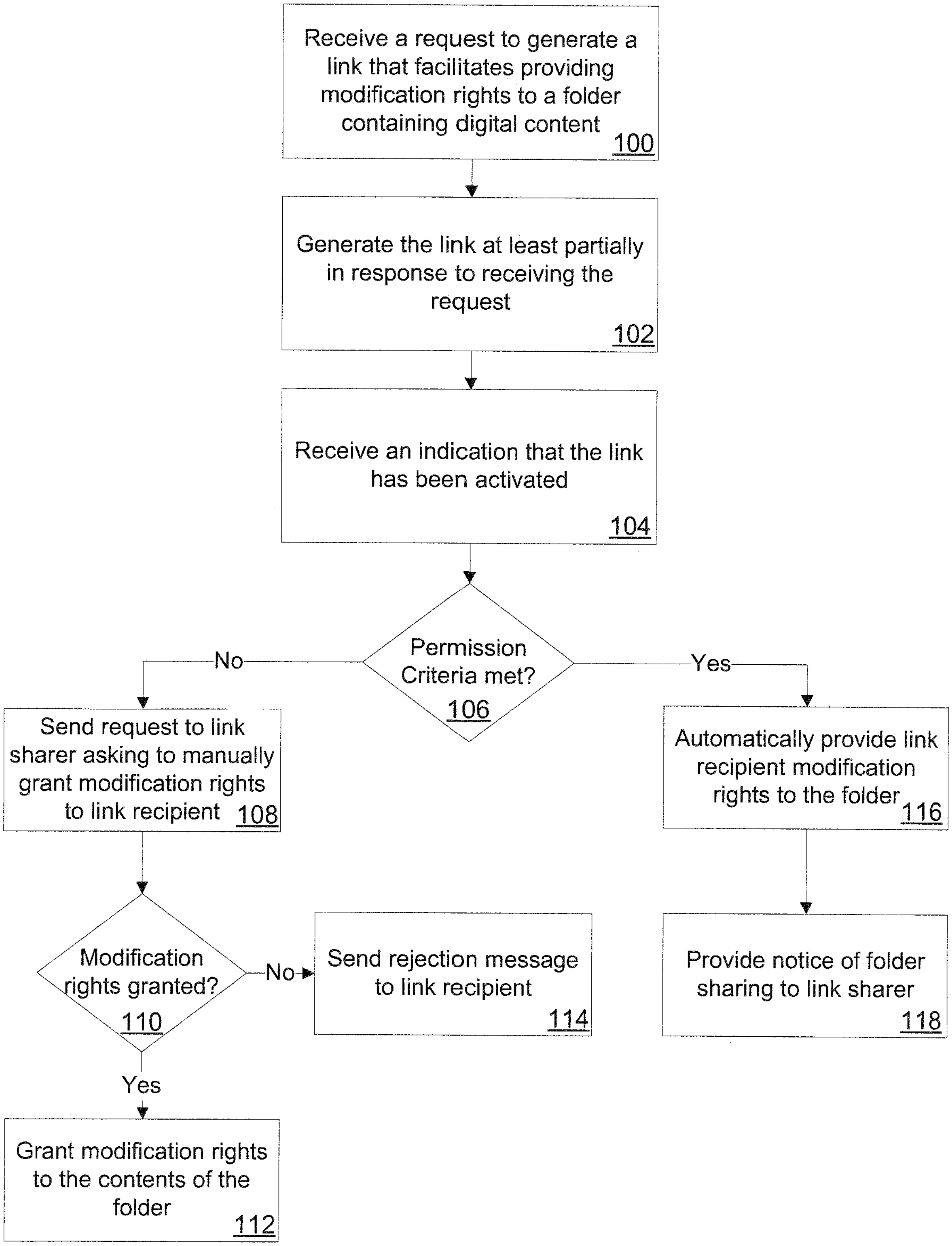
FIG. 4 depicts a flow chart that generally illustrates various steps executed by a file sharing system for requesting modification rights to a linked folder from a shared link in accordance with one embodiment of the present system.

FIG. 4 depicts a method for allowing a link sharer to provide a link recipient modification rights to a shared folder, which may contain, for example, various digital files and other folders. The system may do this by generating a link that the link sharer sends to the link recipient, and which the link recipient uses to obtain modification rights to the linked folder. In various embodiments, the link facilitates a modification rights request to a particular folder (or group of folders) specified by the link-sharer.

Beginning at step 100, the file storage server system 20 (FIG. 1) receives a request, from a link sharer, to generate a link to one or more folders 14 stored in database 28. At step 102, the link generator 32 of sharing module 26 generates the link to the folder(s) at least partially in response to receiving the request. The link sharer may then share the generated link by posting the link on a social media website (e.g., Facebook), transmitting the link to users via a micro-blogging site (e.g., Twitter), by including the link in an email, or in any other suitable way. In various embodiments, the link is configured to cause the file storage server system to facilitate the provision of modification rights to the linked file folder(s) (e.g., to a specified folder within the link sharer's account). Such modification rights may, for example, provide the link recipient with the ability to read files, edit files, delete files, add files and move files associated with the linked file folder stored on the file storage server system. The link may also serve to add the folder to a document management service account (e.g., a Dropbox account) associated with the link recipient. Next, in step 104, the file storage server system is configured to receive an indication when a link recipient activates (e.g., clicks on the link) a shared folder link.

In response to detecting that the link has been activated by a link recipient, at step 106, the file storage server system checks at least one permission criterion to determine whether the link recipient should be provided with shared access to the linked folder based on one or more criteria that the link sharer sets. The link sharer may define such criteria globally as preferences, or may establish the criteria on a link-by-link basis. In various embodiments, suitable permission criteria may include, for example: (1) the link sharer and the link recipient belonging to a common domain, social media collective or other user-defined group; (2) the link recipient's email address being included in the link sharer's contact information or address book; and/or (3) the link recipient being a registered user of the file storage server system. In other embodiments, the criteria may be based on any number of other conditions determinable by the system. In various embodiments, if the specified criteria are met, the system provides the user with shared access to the folder. In other embodiments, when setting up the link, the link sharer may specify that they must specifically authorize any grants of shared access to the folder.

If the file storage server system 20 determines, at step 106, that the permission criteria are met, the file storage server system grants the link recipient shared access to the linked folder at step 116, and at step 118, the system sends a notice (e.g., to the link recipient and/or the link sharer) that the link recipient has modification rights to the shared folder.

Otherwise, at step 108, the file storage server system 20 sends a request to the link sharer indicating that the link recipient is awaiting modification rights to the linked folder. At step 110, the file server storage system 20 checks whether the link sharer has manually granted modification rights to the link recipient (which the system may facilitate by displaying an appropriate message to the link sharer indicating that the link recipient is awaiting approval for modification rights to the shared folder). At step 112, if the link sharer approves the modification rights, the file storage server system 20 grants the link recipient modification rights to the shared folder and notifies the link recipient. Otherwise, at step 114, the file storage server system 20 sends a shared folder rejection notice to the link recipient to indicate that the link sharer will not grant modification rights to the shared folder. In particular embodiments, if modification rights are not granted within a predetermined period of time (e.g., within 2 weeks), the system automatically discards the request.

It should be understood that the various steps described herein may vary in the context of different embodiments and that certain steps may be omitted and other steps may be added.

Example User Experience

The following exemplary user experience is described in reference to a file sharing system provided by Dropbox, Inc. of San Francisco, CA (hereinafter DROPBOX). However, it should be understood after review of this disclosure by those of skill in the relevant field that the functionality described herein may be used with other file sharing systems. FIGS. 5-10 are computer screen shots that may be used to understand the experience of a link sharer and link recipient as they use the present systems and methods disclosed herein.

Link Sharing

A link sharer may generate a link to share a folder via link generation module 32 (FIG. 3) in different manners depending on the configuration of the file server storage system (FIG. 1). In one embodiment and referring to FIG. 5A, the link sharer may generate a link using the file storage service client application 12 provided on client device 10. In one particular implementation, when a user right clicks on a folder 59 to be shared, menu 60 opens allowing the user to select a DROPBOX option, thereby opening a second, context-sensitive menu. From the second menu, the link sharer may select a "get link to share this folder" menu item 62.

Figure 5A:
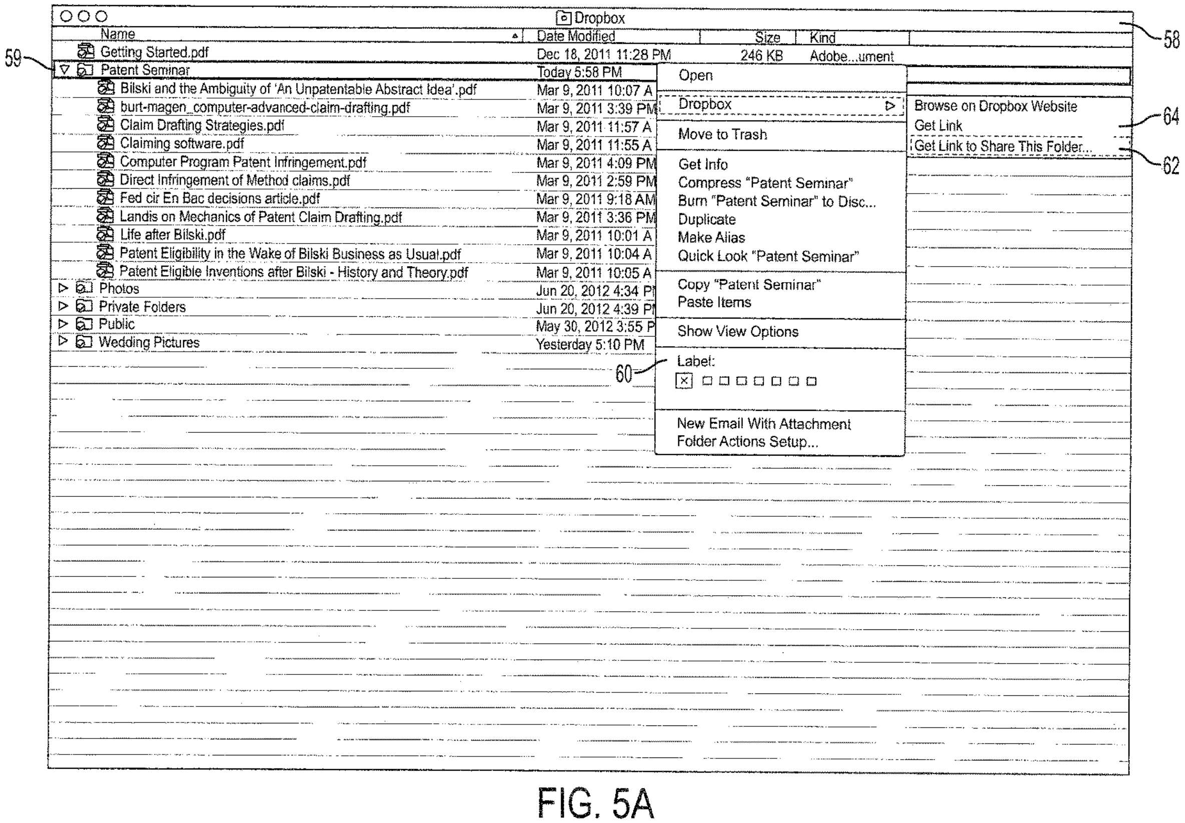
FIG. 5A illustrates one embodiment of a user interface menu for creating a folder-sharing link for use in the file management system of FIG. 1.
Figure 5B:
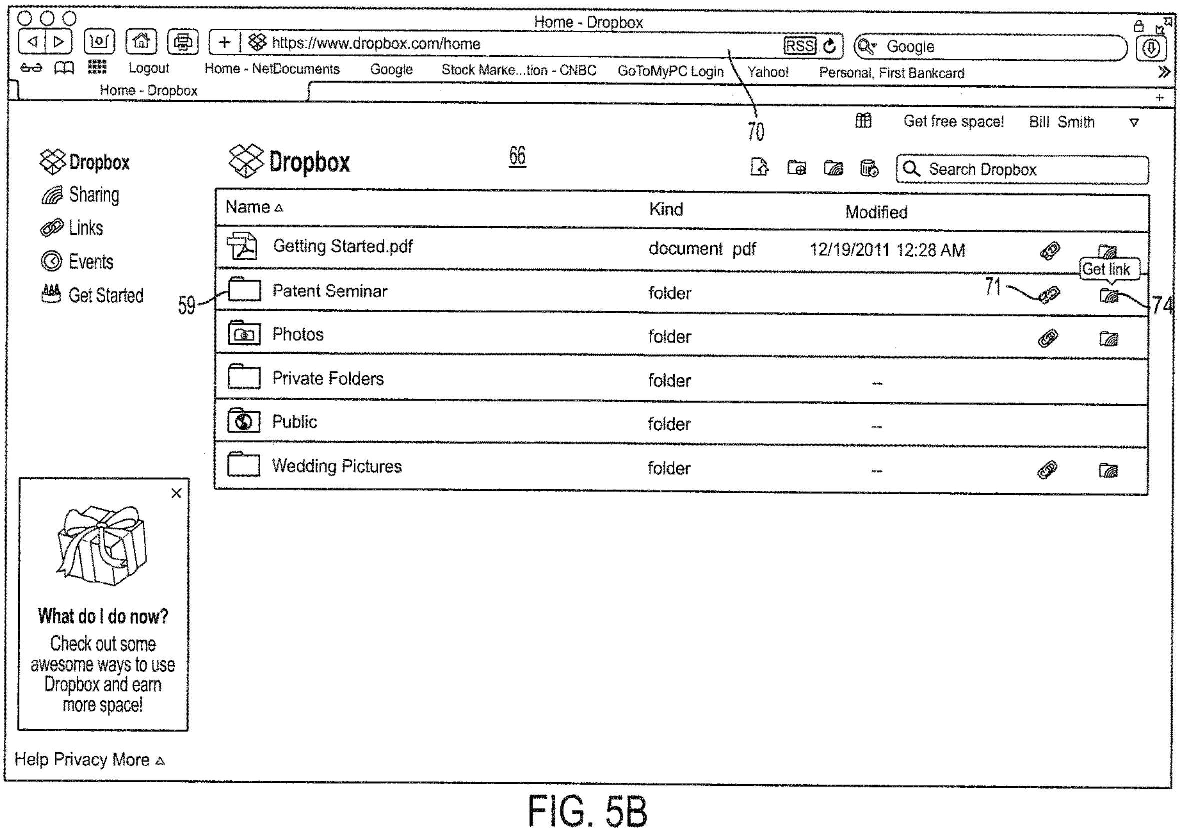
FIG. 5B illustrates another embodiment of a user interface for creating a folder sharing link for use in the file management system of FIG. 1.

In still another embodiment illustrated in FIG. 5B, the link sharer opens a client interface in a browser window 66 and logs into their account, for example an account with DROPBOX service. In doing so, the link sharer can view stored files and folders in their account. If the link sharer wants to provide shared access to a particular file, the link sharer can select a "get link" icon 74 to share the folder 59. In response to receiving the request, the file storage service system 20 generates a link that the link sharer can send to potential link recipients as explained below.

Figure 6:
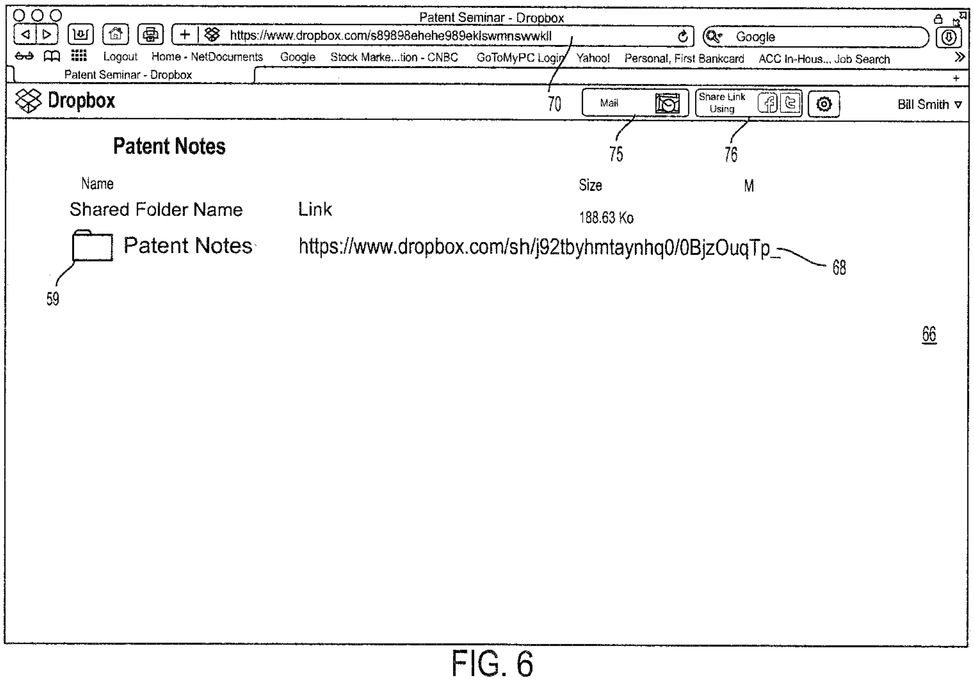
FIG. 6 illustrates a user interface window showing the link generated for a shared folder in accordance with one embodiment of the present system.

Referring to FIG. 6, once the "get link to share folder" menu item 62 (FIG. 5A) or icon 74 (FIG. 5B) is selected, a browser window 66 opens displaying the generated folder sharing link 68 for the shared folder 59. In some embodiments, an e-mail button 75 is presented to allow the link sharer to send the link via a local e-mail client on client device 10, or through a server side e-mail client that is part of the file storage server system 20.

In other embodiments in which the link sharer wishes the share the link with a group of link recipients, a link sharing option area 76 is displayed that allows the user to share the link using a social media program, for example, FACEBOOK, TWITTER or YAHOO Groups. Selection from link sharing option area 76 prompts the link sharer for their login information for the selected service. Assuming that correct login information is provided, link distribution module 36 uses an application-programming interface ("API") of the selected service to disseminate the link via the service, such as by adding it as a post to the link sharer's page on a social networking service (e.g. Facebook), by sending it as part of a textual message on a micro blogging service (e.g. Twitter), or by posting the link to a group wall (e.g., Yahoo Groups) where members of the group can access the link. It should be understood that the generated link 68 could be shared by copying the link and posting it on any webpage or through any other suitable sharing means.

Link Activation

Figure 7:
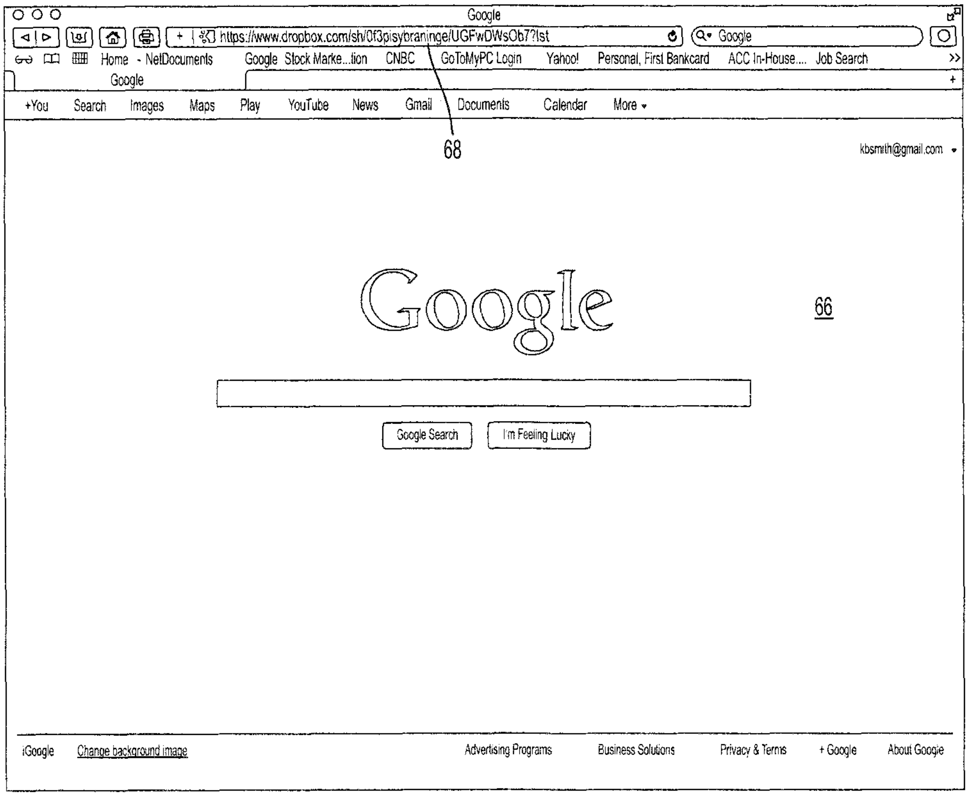
FIG. 7 illustrates one embodiment of a browser window that can be used to activate a shared folder link in accordance with one embodiment of the present system.

Once the link recipient receives the link or locates the link on a webpage, the link recipient may, for example, select (e.g., click on) the link if it is an active link or, referring to FIG. 7, the link recipient may copy the link and paste it into their browser's address bar. Upon activating the link, the file access module 34 (FIG. 3) receives an indication that the link has been activated and checks the link sharer's preferences to determine if shared folder access should be provided to the link recipient. For example, in some embodiments, the link sharer may create a link that provides shared folder access (e.g., modification rights) to anyone who activates the link. In other embodiments, the link sharer may set certain permission criteria that must be satisfied for the link recipient to obtain shared folder access, and in still other embodiments, the link sharer may set their preferences so that the link sharer must manually approve each link recipient before shared folder access rights are provided to the folder.

Figure 8:
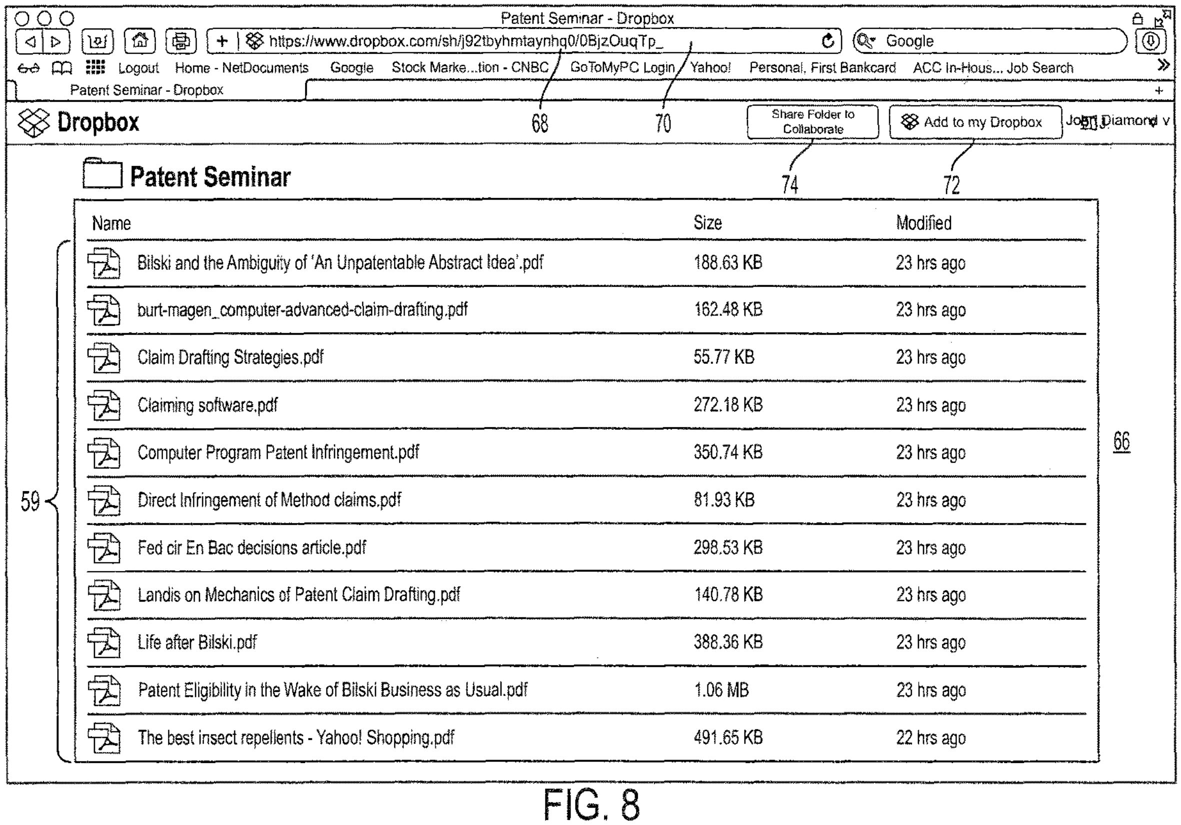
FIG. 8 illustrates a browser window that presents the contents of a shared folder that is associated with a link in accordance with one embodiment of the present system.
Figure 9:
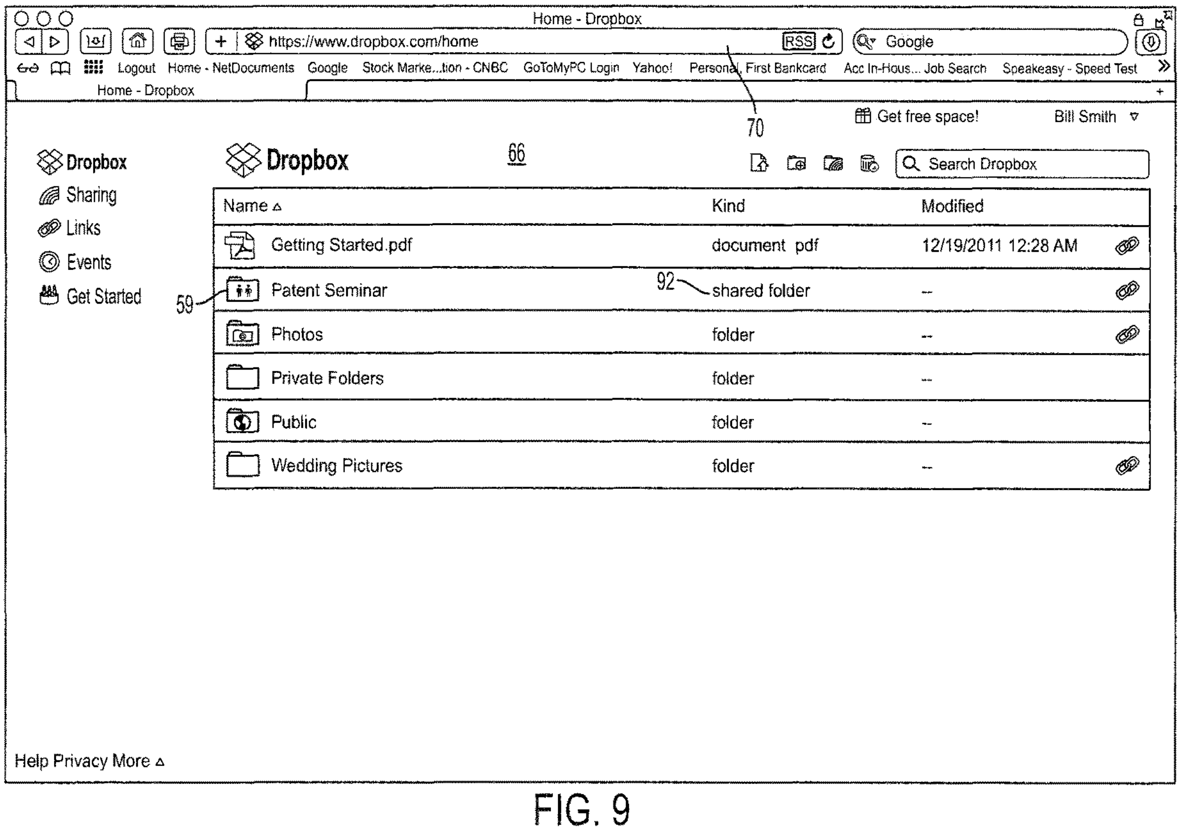
FIG. 9 illustrates the user interface of FIG. 5B indicating that modification rights have been granted to the linked folder in accordance with one embodiment of the present system.
Figure 10:
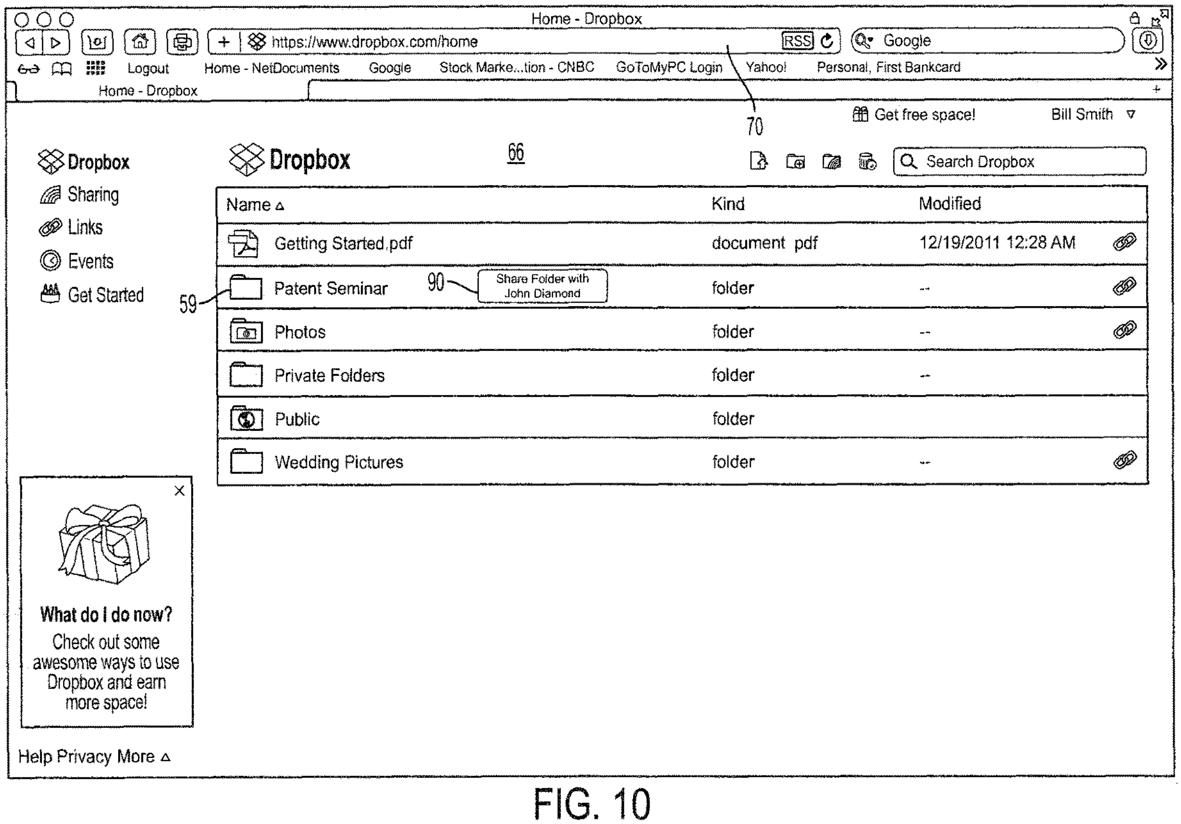
FIG. 10 illustrates a user interface that allows a user to manually grant modification rights to a folder associated with a link in accordance with one embodiment of the present system.

Referring to FIG. 8, once the system grants the link recipient shared folder access, a browser window 66 opens displaying a representation of the contents of the shared folder 59. In various embodiments, the system may automatically add the shared folder 59 to the user's account. In other embodiments, the user may manually add the shared folder to their account by clicking an "add to my Dropbox" button 72. Referring to FIG. 9, in various embodiments the system may notify the link sharer that a link recipient has shared access right to a folder by changing the folder identification 92 from a "folder" designation to a "shared folder" designation.

Example of Particular Use

In various embodiments, the link sharer may set their preferences such that any link recipient that activates a shared folder link is provided shared folder access to the linked folder. For example, the link sharer may wish to collect the names and addresses of all of the students within a particular class. To do so, they may create a document entitled "Student Names/Addresses" and place the document in a folder titled "Student Information". The link sharer may then use the system to create a link to the shared folder as described above and then e-mail the link to everyone in the class. Each member of the class could then: (1) use the link to add the shared folder to their document sharing service (e.g., their DROPBOX document sharing service); and (2) edit the document so that it includes their name and address. The students may continue to use the shared folder to share notes or other files, or to collaborate on other documents.

Example Showing Manual Approval of Modification Rights

As discussed above, in various embodiments in which the link sharer generates a link that requires manual approval for the link recipient to receive shared folder access to a folder, the file storage server system 20 does not automatically direct the link recipient to the contents of the shared folder when they activate the link. Instead, the file storage server system 20 sends a request to the link sharer asking them to approve the grant of modification rights to the link recipient. For example, and referring to FIG. 10, when the link sharer logs into their account on the file storage server system 20, a browser window 66 may open displaying the contents of their account. In various embodiments, the browser interface window looks similar to that shown in FIG. 5B, except that the system presents a "share folder" button 90 that, when clicked, allows the link sharer to provide shared access to the folder 59. In this way, the system notifies the link sharer each time a new link recipient activates the link 68. If the link sharer grants the link recipient shared folder access, in some embodiments the system may be configured to provide the link recipient notice of the shared folder access. For example, in various embodiments, the system may prompt the link recipient to add the folder to a document management service account (e.g., a Dropbox account) associated with the link recipient. In other embodiments, the system may send the link recipient an e-mail notice indicating that the link sharer granted shared folder access.

Figure 11:
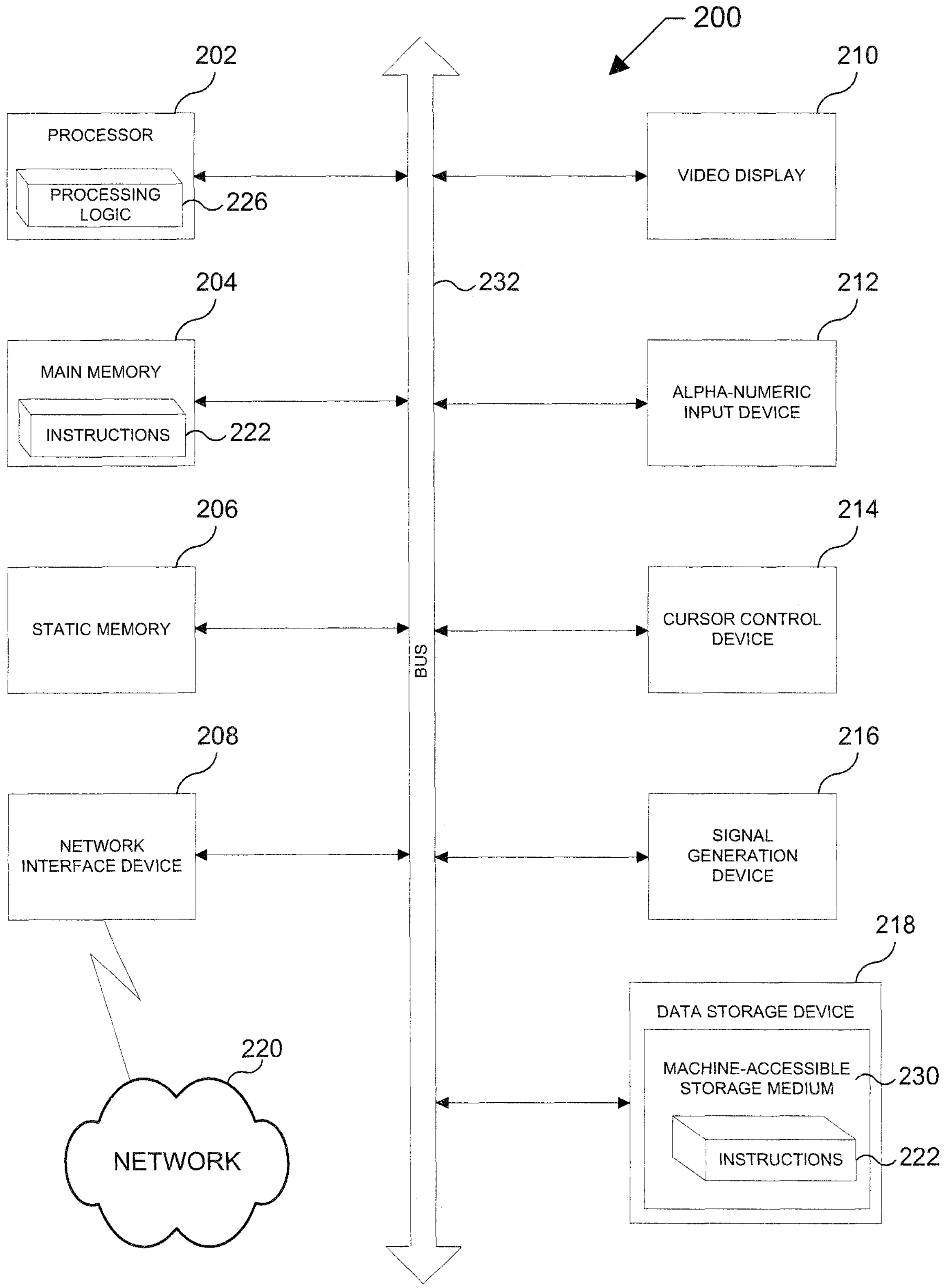
FIG. 11 is a block diagram of a computer that may be used, for example, as a client or server computer within the context of the File Management System of FIG. 1.

FIG. 11 illustrates a diagrammatic representation of a computer 200 that can be used within the file management system 5, for example, as a client computer (e.g., one of the client computers 10 shown in FIG. 1), or as a server computer (e.g., the File Storage Server System 20 shown in FIG. 1). In particular embodiments, the computer 200 may be suitable for use as a computer of a link sharer or as a computer of a link recipient as these computers operate as clients within the context of the file storage server system 20 to facilitate the sharing of folder between a link sharer and a link recipient as discussed above.

In particular embodiments, the computer 200 may be connected (e.g., networked) to other computers in a LAN, an intranet, an extranet, and/or the Internet. The computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a Personal Digital Assistant (PDA), a cellular telephone, a web appliance, a server, a network router, a switch or bridge, or any computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

The exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute the processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within the main memory 204 and/or within the processing device 202 during execution thereof by the computer 200, the main memory 204 and the processing device 202 also constituting computer-accessible storage media. The software 222 may further be transmitted or received over a network 220 via the network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" shall also be understood to include any medium that is capable of storing, encoding or carrying a set of instructions for execution by the computer and that cause the computer to perform any one or more of the methodologies of the present invention. The term "computer-accessible storage medium" shall accordingly be understood to include, but not be limited to, solid-state memories, optical and magnetic media, etc.

CONCLUSION

Many modifications and other embodiments of the invention will come to mind to one skilled in the art to which this invention pertains having the benefit of the teachings presented in the foregoing descriptions and the associated drawings. For example, it should also be understood that, although various embodiments are described above as using a link (e.g., a URL) to provide user access to a shared folder, any other suitable indicia may be used for this purpose such as a link that includes a file path to the folder.

In particular embodiments, the process of granting users shared access to folders may be granted within the context of a synched file system such as the DROPBOX service. Various techniques associated with granting access to shared folders are described in the following patent applications, which are each hereby incorporated herein by reference in their entirety: (1) U.S. Patent Application No. 61/233,787, entitled "Systems and Methods for Sharing Data," which was filed on Aug. 18, 2009, and (2). U.S. patent application Ser. No. 12/856,581, entitled "Network Folder Synchronization", which was filed on Aug. 13, 2010.

Various embodiments are described above as being adapted: (1) to automatically provide shared access to a particular folder if certain criteria are met; and (2) if the criteria are not met, to require the link sharer to manual grant modification rights. However, it should be understood that, in certain embodiments, the granting process may either be entirely automatic or entirely manual.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed:

1. A computer-implemented method comprising:

receiving a first input via a user interface of a client application associated with a first user account of a content management system, wherein the first input causes a sharing menu associated with a folder to open on a client device;

receiving, via the user interface of the client application at the client device, a second input associated with the sharing menu, wherein the second input selects one or more permissions criteria granting access rights and modification rights to the folder upon activation of a link;

in response to the second input, generating, by a link generator at the client application, the link to the folder, wherein the link includes the one or more permissions criteria and the one or more permissions criteria include establishing one or more access levels applied to each account that receives the link;

receiving, at the client application from the content management system, an indication that the link was activated via a request to access the folder from an application external to the content management system;

in response to the indication, receiving at the client application a determination from the content management system that the indication is from a second user account associated with the content management system;

receiving at the client application a determination from the content management system of whether the second user account is allowed to automatically receive access rights and modification rights or whether a request is triggered that indicates a link recipient is awaiting the access rights and the modification rights based on the one or more permission criteria set by the first user account, wherein the one or more permission criteria allow the second user account to receive the access rights and the modification rights;

based on the second user account having the one or more permission criteria set by the first user account, receiving an indication from the content management system at the client application that the second user account was granted the access rights and the modification rights for the folder;

in response to granting the access rights and the modification rights for the folder to the second user account, receiving an indication from the content management system that the second user account was provided access to the folder and a set of permissions to interact with content in the folder, the indication comprising a change in a folder identification for the folder from a folder designation to a shared folder designation; and automatically adding, to the content management system, the folder to a second folder associated with the second user account based on granting the access rights and the modification rights for the folder to the second user account.

2. The computer-implemented method of claim 1, wherein granting the access rights and the modification rights for the folder to the second user account includes sending a request to the first user account to ask for approval of granting the access rights and the modification rights to the second user account.

3. The computer-implemented method of claim 1, wherein the content management system notifies the first user account when a new link recipient activates the link.

4. The computer-implemented method of claim 1, further comprising:

presenting an icon representing the folder stored at the client device and synchronized at the content management system; and receiving a selection in association with the presented icon that initiates the link generator.

5. The computer-implemented method of claim 1 further comprising:

sending an electronic communication including the link to an activator of the link external to the content management system.

6. The computer-implemented method of claim 1, further comprising:

presenting a link sharing option that shares the link with a social media application external to the content management system, wherein an application programming interface (API) disseminates the link to the social media application.

7. The computer-implemented method of claim 1, wherein the one or more permissions criteria are applied globally to all generated links.

8. The computer-implemented method of claim 1, wherein the adding of the folder causes an opening of a browser window to display a representation of the contents of the second folder.

9. The computer-implemented method of claim 1, further comprising:

displaying a representation of content of the folder on a second client device of the second user account upon being granted the access rights and the modification rights for the folder.

10. The computer-implemented method of claim 1, further comprising:

in response to granting the access rights to the second user account, prompting the second user account to add the folder to the second folder associated with the second user account.

11. A non-transitory computer readable medium comprising instructions, the instructions, when executed by a computing system, cause the computing system to:

receive a first input via a user interface of a client application associated with a first user account of a content management system, wherein the first input causes a sharing menu associated with a folder to open on a client device;

receive, via the user interface of the client application at the client device, a second input associated with the sharing menu, wherein the second input selects one or more permissions criteria granting access rights and modification rights to the folder upon activation of a link;

in response to the second input, generate, by a link generator at the client application, the link to the folder, wherein the link includes the one or more permissions criteria and the one or more permissions criteria include establishing one or more access levels applied to each account that receives the link;

receive, at the client application from the content management system, an indication that the link was activated via a request to access the folder from an application external to the content management system;

in response to the indication, receive at the client application a determination from the content management system that the indication is from a second user account associated with the content management system;

receive, at the client application, a determination from the content management system of whether the second user account is allowed to automatically receive access rights and modification rights or whether a request is triggered that indicates a link recipient is awaiting the access rights and the modification rights based on the one or more permission criteria set by the first user account, wherein the one or more permission criteria allow the second user account to receive the access rights and the modification rights;

based on the second user account having the one or more permission criteria set by the first user account, receive an indication from the content management system at the client application that the second user account was granted the access rights and the modification rights for the folder;

in response to granting the access rights and the modification rights for the folder to the second user account, receive an indication from the content management system that the second user account was provided access to the folder and a set of permissions to interact with content in the folder, the indication comprising a change in a folder identification for the folder from a folder designation to a shared folder designation; and automatically add, to the content management system, the folder to a second folder associated with the second user account based on granting the access rights and the modification rights for the folder to the second user account.

12. The non-transitory computer readable medium of claim 11, wherein granting the access rights and the modification rights for the folder to the second user account includes sending a request to the first user account to ask for approval of granting the access rights and the modification rights to the second user account.

13. The non-transitory computer readable medium of claim 11, wherein the content management system notifies the first user account when a new link recipient activates the link.

14. The non-transitory computer readable medium of claim 10, wherein the instructions further cause the computing system to:

present an icon representing the folder stored at the client device and synchronized at the content management system; and receive a selection in association with the presented icon that initiates the link generator.

15. The non-transitory computer readable medium of claim 11, wherein the instructions further cause the computing system to:

send an electronic communication including the link to the second user account that causes activation of the link external to the content management system.

16. The non-transitory computer readable medium of claim 11, wherein the instructions further cause the computing system to:

present a link sharing option that shares the link with a social media application external to the content management system, wherein an application programming interface (API) disseminates the link to the social media application.

17. The non-transitory computer readable medium of claim 11, wherein the one or more permissions criteria are applied globally to all generated links.

18. A system comprising:

at least one processor; and at least one computer readable medium storing instructions, wherein when executed by the at least one processor, the instructions are effective to cause the system to:

receive a first input via a user interface of a client application associated with a first user account of a content management system, wherein the first input causes a sharing menu associated with a folder to open on a client device;

receive, via the user interface of the client application at the client device, a second input associated with the sharing menu, wherein the second input selects one or more permissions criteria granting access rights and modification rights to the folder upon activation of a link;

in response to the second input, generate, by a link generator at the client application, the link to the folder, wherein the link includes the one or more permissions criteria and the one or more permissions criteria include establishing one or more access levels applied to each account that receives the link;

receive, at the client application, from the content management system, an indication that the link was activated via a request to access the folder from an application external to the content management system;

in response to the indication, receive at the client application, a determination from the content management system that the indication is from a second user account associated with the content management system;

receive, at the client application, a determination from the content management system of whether the second user account is allowed to automatically receive access rights and modification rights or whether a request is triggered that indicates a link recipient is awaiting the access rights and the modification rights based on the one or more permission criteria set by the first user account, wherein the one or more permission criteria allow the second user account to receive the access rights and the modification rights;

based on the second user account having the one or more permission criteria set by the first user account, receive an indication from the content management system at the client application that the second user account was granted the access rights and the modification rights for the folder;

in response to granting the access rights and the modification rights for the folder to the second user account, receive an indication from the content management system that the second user account was provided access to the folder and a set of permissions to interact with content in the folder, the indication comprising a change in a folder identification for the folder from a folder designation to a shared folder designation; and automatically add, to the content management system, the folder to a second folder associated with the second user account based on granting the access rights and the modification rights for the folder to the second user account.

19. The system of claim 18, wherein granting the access rights and the modification rights for the folder to the second user account includes sending a request to the first user account to ask for approval of granting the access rights and the modification rights to the second user account.

20. The system of claim 18, wherein the content management system notifies the first user account when a new link recipient activates the link.

* * * * *